US012677215B2

(12) United States Patent (10) Patent No.: US 12,677,215 B2
Polehn et al. (45) Date of Patent: Jul. 7, 2026

(54) SYSTEMS AND METHODS FOR INTELLIGENT REPEATER OFFLOAD IN A RADIO ACCESS NETWORK

(71) Applicant: Verizon Patent and Licensing Inc., Basking Ridge, NJ (US)

(72) Inventors: Donna L. Polehn, Mercer Island, WA (US); Corey J. Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 18/615,293

(22) Filed: Mar. 25, 2024

(65) Prior Publication Data

US 2025/0301403 A1 Sep. 25, 2025

(51) Int. Cl.
*H04W 52/02* (2009.01)
*H04B 7/155* (2006.01)
*H04W 36/08* (2009.01)
*H04W 36/30* (2009.01)

(52) U.S. Cl.
CPC .... *H04W 52/0206* (2013.01); *H04B 7/15507* (2013.01); *H04W 36/08* (2013.01); *H04W 36/30* (2013.01)

(58) Field of Classification Search
CPC .. H04B 7/02; H04B 7/15507; H04B 7/15514; H04B 7/185; H04B 7/18536; H04W 16/26; H04W 16/28; H04W 36/0079; H04W 36/08; H04W 36/083–087; H04W 36/30; H04W 36/305; H04W 52/0206; H04W 84/047; H04W 88/04; H04W 88/08; H04W 88/085; Y02D 30/70
See application file for complete search history.

(56) References Cited

U.S. PATENT DOCUMENTS

| | | | | |
|---|---|---|---|---|
| 10,021,521 | B1 * | 7/2018 | Reeves | ................. H04W 4/023 |
| 2021/0037459 | A1 * | 2/2021 | Li | ......................... H04B 17/327 |
| 2021/0345218 | A1 * | 11/2021 | Tsuda | ................ H04W 72/0453 |

(Continued)

OTHER PUBLICATIONS

Araniti, et al., "Energy efficient handover algorithm for green radio networks," 2014 IEEE International Symposium on Broadband Multimedia Systems and Broadcasting, Beijing, China, 2014, pp. 1-6, doi: 10.1109/BMSB.2014.6873558 (Year: 2014).*

(Continued)

*Primary Examiner* — Thomas R Cairns

(57) ABSTRACT

A system described herein may identify one or more Key Performance Indicators ("KPIs") associated with a first base station. The system may identify, based on the one or more KPIs, an occurrence of a particular event, and select a second base station and a repeater device. The repeater device and the second base station may implement the same set of wireless frequencies. The system may cause the repeater device to repeat wireless signals transmitted to or from the second base station, and may cause the first base station to shut down or to enter a low-power mode. A UE that is wirelessly connected to the first base station prior to the first base station shutting down or entering the low-power mode, may wirelessly connect to the second base station via the repeater device based on the first base station shutting down or entering the low-power mode.

20 Claims, 10 Drawing Sheets

(56)  References Cited

U.S. PATENT DOCUMENTS

2023/0363020 A1*  11/2023  Back ..................... H04W 76/20

OTHER PUBLICATIONS

Narayan et al., "Efficient Hand Offs with in Energy Efficient Base Stations of Green Cellular Networks, " 2015 International Journal of Engineering Research & Technology (IJERT) vol. 04, Issue 01, pp. 395-400 (Year: 2015).*
Yunusa et al., "Energy Saving and Handover Decision Algorithm for Cellular Base Station Communication Systems in Nigeria," 2020 International Journal of Engineering and Science (IJSES), ISSN (online): 2456-7361, vol. 4, Issue 2, pp. 8-14, (Year: 2020).*

* cited by examiner

Figure 2:
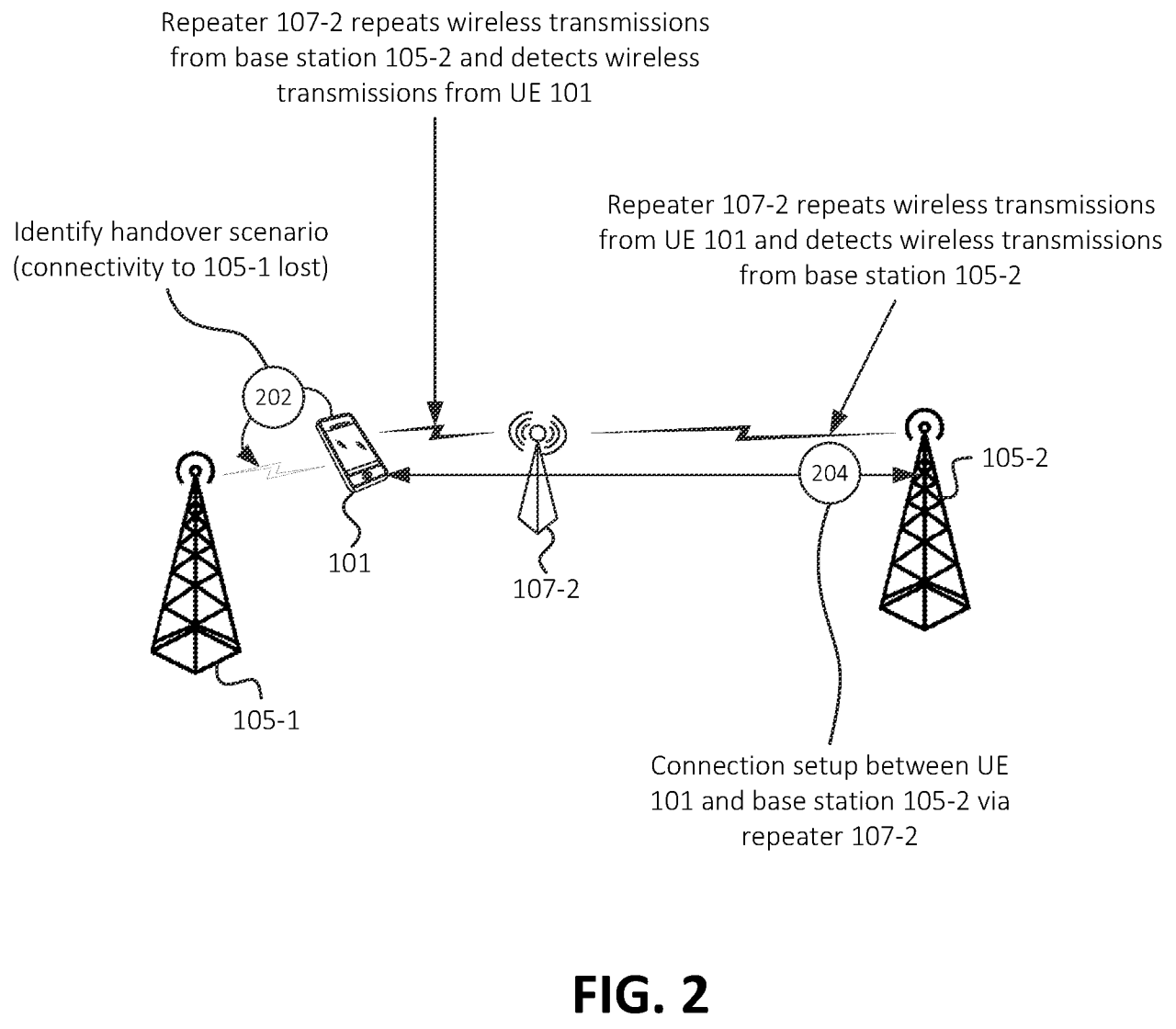

Repeater 107-2 repeats wireless transmissions from base station 105-2 and detects wireless transmissions from UE 101

Repeater 107-2 repeats wireless transmissions from UE 101 and detects wireless transmissions from base station 105-2

Connection setup between UE 101 and base station 105-2 via repeater 107-2

Identify handover scenario (connectivity to 105-1 lost)

702 Monitor RAN and/or UE KPIs

704 Identify shutdown event for first base station based on monitored KPIs

706 Select second base station and repeater

708 Instruct repeater to repeat wireless signals associated with second base station 710 Cause first base station to power down or enter low-power mode

SYSTEMS AND METHODS FOR INTELLIGENT REPEATER OFFLOAD IN A RADIO ACCESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include wireless network infrastructure equipment, such as base stations, which include antennas, radios, and/or other types of hardware that send and/or receive wireless signals to and/or from UEs. Base stations may also perform baseband processing, such as translating lower layer (e.g., physical or "PHY" layer) data streams to upper layer (e.g., Packet Data Convergence Protocol ("PDCP") layer or other layers) packets, and vice versa. The operation of a base station, including sending and receiving wireless transmissions as well as performing baseband processing, may consume significant amounts of electrical power.

BRIEF DESCRIPTION OF THE DRAWINGS

FIGS. 1 and 2 illustrate an example overview of one or more embodiments described herein;

DETAILED DESCRIPTION OF EXAMPLE EMBODIMENTS

The following detailed description refers to the accompanying drawings. The same reference numbers in different drawings may identify the same or similar elements.

Embodiments described herein provide for an offload mechanism for a RAN of a wireless network, in which low-power devices (e.g., wireless repeaters) may be selectively used to provide wireless connectivity to UEs. As discussed herein, the offload mechanism may include shutting down one or more base stations of the RAN, causing the base stations to enter a low-power or "standby" mode, or the like. Embodiments may include causing a wireless repeater device to repeat wireless signals associated with one or more bands or radio access technologies ("RATs") implemented by a second base station. In accordance with some embodiments, UEs that are within a coverage area of the wireless repeater may, in effect, receive wireless connectivity from the second base station, even if such UEs are not within a coverage area of the second base station.

Figure 1:
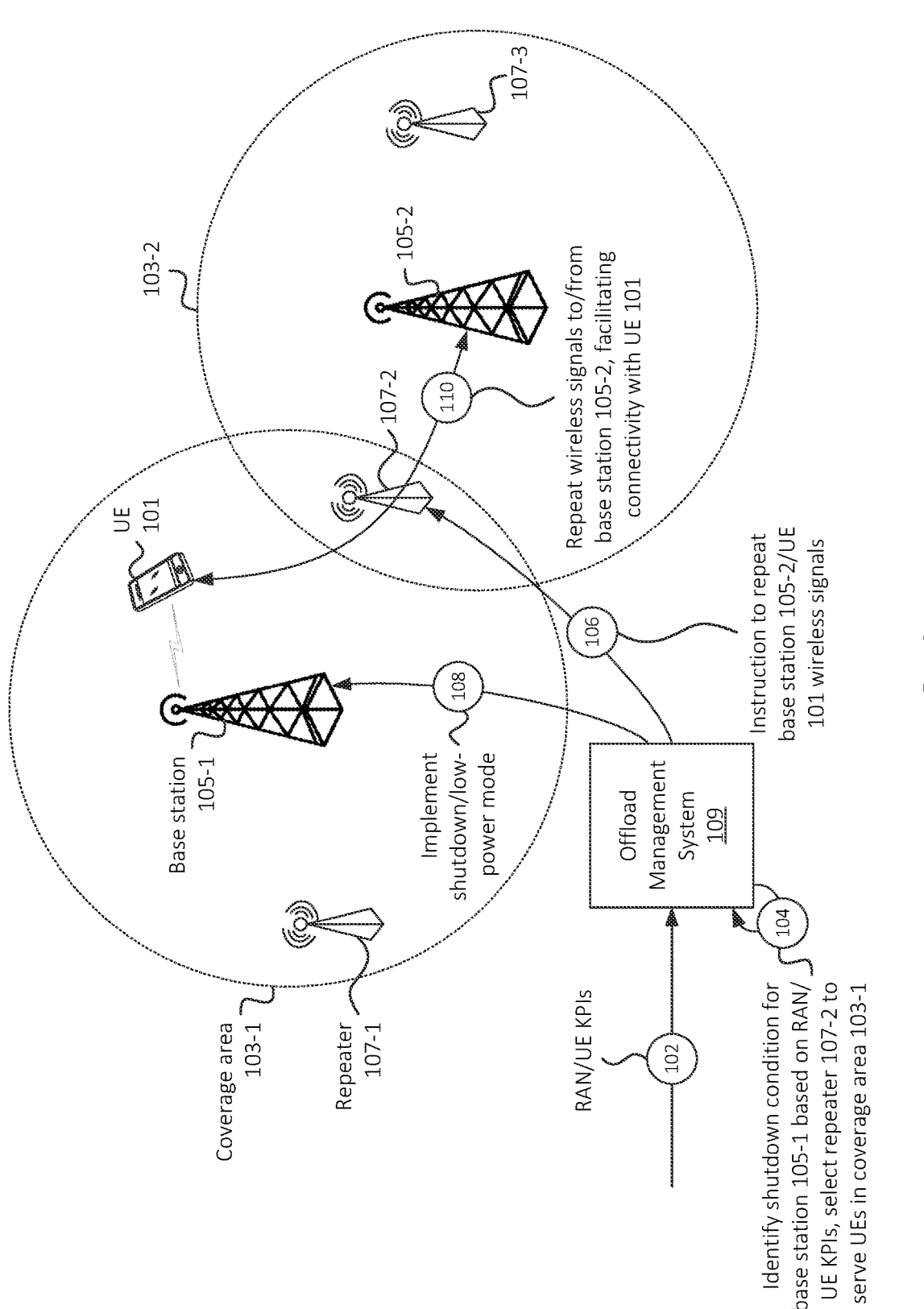

For example, as shown in FIG. 1, a particular UE 101 may be within a first coverage area 103-1 of a first base station 105-1. In this example, UE 101 is also outside of a second coverage area 103-2 of a second base station 105-2. In these examples, coverage areas 103-1 and 103-2 are represented as circles for the sake of explanation. In practice, respective coverage areas 103 of base stations 105 may be different shapes and/or may vary with time (e.g., due to beamforming, Multiple-Input Multiple-Output ("MIMO") techniques, or other factors). Additionally, in practice, coverage areas 103 may vary based on factors such as sensitivity of one or more radios or antennas of UE 101 or other devices (e.g., coverage area 103-1 may be larger with respect to a first UE that has relatively more sensitive radios, but may be smaller with respect to a second UE that has relatively less sensitive radios). As noted above, coverage areas 103 are represented as single, static circles for the sake of explanation of embodiments described herein.

By virtue of being within coverage area 103-1, UE 101 may be able to receive wireless connectivity from base station 105-1 (e.g., may be able to receive or detect wireless signals transmitted by base station 105-1). On the other hand, by virtue of being outside of coverage area 103-2, UE 101 may not be able to receive wireless connectivity directly from base station 105-2 (e.g., may not be able to receive or detect wireless signals transmitted by base station 105-2). As further shown in FIG. 1, one or more low-power repeaters 107 (e.g., wireless repeaters 107-1, 107-2, and 107-3) may be located at various locations. For example, wireless repeater 107-1 may be located within coverage area 103-1 and outside of coverage area 103-2, wireless repeater 107-2 may be located within coverage areas 103-1 and 103-2, and wireless repeater 107-3 may be located outside of coverage area 103-1 and within coverage area 103-2.

In accordance with some embodiments, Offload Management System ("OMS") 109 may selectively cause one or more wireless repeaters 107 to act as a repeater with respect to one or more base stations 105 (e.g., base station 105-2, in this example), and may further cause one or more other base stations 105 (e.g., base station 105-1, in this example) to shut down, enter a low-power mode, etc. Shutting down base station 105-1 may conserve electrical power that would otherwise be used to power hardware such as antennas, radios, cooling apparatus, processors, etc. that is used to implement base station 105-1. OMS 109 may perform these shutdown operations such that the impact to UEs 101 receiving wireless connectivity from base station 105-1 is minimal, thereby preserving the user experience for such UEs 101.

For example, OMS 109 may receive (at 102) RAN Key Performance Indicators ("KPIs"), UE KPIs, and/or other information on an ongoing, real-time basis. OMS 109 may receive such information from one or more base stations 105 (e.g., via an application programming interface ("API") or other suitable communication pathway), from one or more UEs 101, from a RAN controller that is communicatively coupled to base stations 105, and/or from some other suitable device or system. The RAN KPIs may include load or capacity KPIs, such as a quantity of UEs 101 connected to one or more base stations 105, a measure of available and/or utilized radio resources of one or more base stations 105 (e.g., an amount of used or available Physical Resource Blocks ("PRBs"), an amount of used or available spectrum, etc.), buffer or queue status of one or more base stations 105, or the like. In some embodiments, the UE KPIs may include information such as one or more Quality of Service ("QoS") metrics associated with one or more UEs 101 (e.g., network slice, QoS Class Identifier ("QCI"), UE priority level, and/or other suitable QoS metrics), such as QoS metrics associated with traffic sent to or received by one or more UEs 101. In some embodiments, the UE KPIs may include traffic performance metrics, such as an amount of traffic sent to or received by one or more UEs 101 over a given timeframe, latency of traffic sent to or received by one or more UEs 101, or the like. In some embodiments, OMS 109 may receive or monitor (at 102) one or more other types of KPIs in addition to or in lieu of the examples provided above.

In some embodiments, the KPIs received or monitored (at 102) by OMS 109 may include values based on actual real-world measurements (e.g., an actual load or capacity of base stations 105, an actual set of traffic performance metrics associated with one or more UEs 101, etc.). In some embodiments, the KPIs received or monitored (at 102) by OMS 109 may include estimated, predicted, or modeled values (e.g., based on artificial intelligence/machine learning ("AI/ML") modeling techniques, statistical modeling techniques, predictive modeling techniques, or other suitable techniques). For example, OMS 109 may determine, based on historical information and/or one or more AI/ML models, that a quantity of connected UEs 101 at a given base station 105 is predicted to be at a certain quantity (or range of quantities) at a given future timeframe.

In some embodiments, OMS 109 may receive or maintain configuration or status information associated with one or more UEs 101, base stations 105, and/or wireless repeaters 107. For example, OMS 109 may receive location information associated with such UEs 101, base stations 105, and/or wireless repeaters 107. In situations where UEs 101 and/or wireless repeaters 107 are moving, OMS 109 may receive such location information on an ongoing basis, such that OMS 109 is able to monitor such location information in real time.

In some embodiments, the configuration or status information may include information specifying coverage areas associated with base stations 105 and/or wireless repeaters 107. In some embodiments, such coverage area information may include models or other granular information that includes actual or expected measures of signal strength, channel quality, or the like (e.g., Signal-to-Interference-and-Noise-Ratio ("SINR"), Received Signal Strength Indicator ("RSSI"), Channel Quality Indicator ("CQI"), etc.) as a function of distance or location relative to a given base station 105 and/or wireless repeater 107. As another example, the configuration or status information may specify which particular UEs 101 are connected to which particular base stations 105. In some embodiments, the configuration information may specify one or more frequencies, bands, radio access technologies ("RATs"), etc. that are supported by, implemented by, used by, etc. one or more UEs 101, base stations 105, and/or wireless repeaters 107.

OMS 109 may also maintain a set of models, conditions, etc. that may be used by OMS 109 to determine when to implement power-saving procedures in accordance with embodiments described herein. In this example, OMS 109 may identify (at 104) a shutdown condition for base station 105-1 based on the RAN and/or UE KPIs. For example, OMS 109 may identify that base station 105-1 is relatively underutilized (e.g., a load of base station 105-1 is below one or more thresholds, a capacity of base station 105-1 is above one or more thresholds, a utilization ratio of base station 105-1 is below one or more thresholds, a quantity of connected UEs for base station 105-1 is below one or more thresholds, etc.).

OMS 109 may further identify one or more wireless repeaters 107 that are in communication range of some or all UEs that are connected to, or are within communication range of, base station 105-1. For example, OMS 109 may identify that wireless repeaters 107-1 and 107-2 are within communication range of the particular example UE 101 shown in FIG. 1. In this example, OMS 109 may identify that wireless repeater 107-3 is outside of communication range of UE 101 and/or other UEs that are connected to, or are within communication range of, base station 105-1. Accordingly, OMS 109 may identify that wireless repeater 107-3 is not a potential candidate to implement the power-saving techniques described herein, in this situation.

OMS 109 may further identify one or more neighboring base stations 105, such as base station 105-2, that may potentially be able to provide wireless connectivity to UE 101 and/or other UEs that are connected to base station 105-1. For example, OMS 109 may identify that base station 105-2 has sufficient capacity to support UE 101 and/or one or more other UEs that are connected to base station 105-1. That is, based on QoS parameters, traffic metrics, etc. associated with UE 101, and further based on load or capacity metrics associated with base station 105-2, OMS 109 may identify that connecting to base station 105-2 would satisfy the QoS parameters associated with UE 101 (e.g., without impacting or degrading the performance experienced by UE 101) and would further satisfy QoS parameters associated with base station 105-2 (e.g., without impacting or degrading the performance of base station 105-2, such as impacting performance experienced by other UEs that are connected to base station 105-2).

OMS 109 may further determine that wireless repeater 107-2 is within communication range of base station 105-2 (e.g., is within coverage area 103-2), and that wireless repeater 107-1 is outside of communication range of base station 105-2 (e.g., is outside of coverage area 103-2). Since wireless repeater 107-1 is outside of communication range of base station 105-2, OMS 109 may determine that wireless repeater 107-1 is not an eligible candidate to implement the power-saving techniques described herein, in this situation. On the other hand, since wireless repeater 107-2 is within communication range of base station 105-2, and is further within communication range of UE 101 (e.g., based on location information of UE 101 and wireless repeater 107-2), wireless repeater 107-2 may be selected for implementing the power-saving techniques described herein.

Additionally, the selection of wireless repeater 107-2 may include identifying that wireless repeater 107-2 is capable of implementing the same frequency, band, RAT, etc. as UE 101 and base station 105-2. In other words, OMS 109 may determine that wireless repeater 107-2 is compatible with radio signals sent and/or received by UE 101 and base station 105-2. In some embodiments, the identified frequency, band, RAT, etc., may be the same with respect to UE 101 and base station 105-2 (e.g., OMS 109 may identify that UE 101, base station 105-2, and wireless repeater 107-2 all implement the same frequency, band, RAT, etc.). In some embodiments, the selection of wireless repeater 107-2 may also include identifying that wireless repeater 107-2 has not already been selected as a repeater for another base station 105 (e.g., is available or is otherwise not unavailable).

OMS 109 may identify traffic performance metrics (e.g., latency, throughput, etc.), wireless signal KPIs (e.g., SINR, RSSI, CQI, etc.) between wireless repeater 107-2 and base station 105-2 and/or between wireless repeater 107-2 and UE 101. As discussed above, such metrics, KPIs, etc. may be determined based on actual measurements and/or based on modeling techniques (e.g., AI/ML modeling techniques). In general, OMS 109 may verify that wireless signals between base station 105-2 and UE 101, as repeated by wireless repeater 107-2, would satisfy QoS parameters, traffic performance metric thresholds, or other thresholds or parameters associated with UE 101 (e.g., to avoid degrading the performance of traffic sent or received by UE 101).

Based on identifying (at 104) the shutdown condition for base station 105-1, and further based on determining that base station 105-2 and wireless repeater 107-2 are able to provide wireless connectivity to UE 101, OMS 109 may output (at 106) one or more instructions, to wireless repeater 107-2, to repeat wireless signals associated with base station 105-2 and UE 101. As discussed above, base station 105-2 may have been selected based on factors such as connectivity (e.g., signal quality) between wireless repeater 107-2 and base station 105-2, connectivity between wireless repeater 107-2 and UE 101, geographical proximity between base station 105-2 and wireless repeater 107-2, geographical proximity between wireless repeater 107-2 and UE 101, availability of resources at base station 105-2 to accommodate the additional load of UE 101, ability of base station 105-2 to meet QoS parameters associated with UE 101, and/or other factors.

In some embodiments, the instruction to wireless repeater 107-2 may indicate one or more frequencies, bands, or RATs to repeat. For example, wireless repeater 107-2 may be able to activate, tune, etc. one or more radios or antennas in order to detect, send, and receive wireless signals associated with such frequencies, bands, or RATs. Additionally, or alternatively, the instruction (at 106) may cause wireless repeater 107-2 to power up or transition from a low-power mode to an active mode.

In some embodiments, the instruction to wireless repeater 107-2 may include locations of base station 105-2 and/or one or more UEs for which service is to be provided by wireless repeater 107-2 (e.g., example UE 101). Such instruction may include instructions to implement beamforming techniques (e.g., holographic beamforming techniques) to optimize the transmission and reception of wireless signals between wireless repeater 107-2 and UE 101, and/or between wireless repeater 107-2 and base station 105-2. Such beamforming techniques may include, for example, directing one or more beams toward base station 105-2 and/or toward UE 101.

OMS 109 may further output (at 108) one or more instructions for base station 105-1 to implement a shutdown and/or a low-power mode. Examples of such instructions, in accordance with some embodiments, are discussed below with respect to FIGS. 3-6. The instructions may, for example, cause base station 105-1 to no longer draw or receive electrical power, and/or to enter into a low-power mode in which power consumption of base station 105-1 is reduced. For example, the instructions may include instructions to reduce radio power, shut down one or more antennas or radios, shut down one or more processing units that perform baseband processing, shut down portions of a cooling apparatus (e.g., fans, water cooling systems, etc.), or the like.

As a result of the shutdown and/or the low-power mode implemented at base station 105-1, one or more UEs that are connected to base station 105-1, such as example UE 101, may lose connectivity to base station 105-1. However, since wireless repeater 107-2 is active (e.g., implementing one or more frequencies, bands, and/or RATs that are implemented by UE 101 and base station 105-2), UE 101 may be able to obtain (at 110) connectivity from base station 105-2, via wireless repeater 107-2. For example, wireless repeater 107-2 may detect wireless transmissions (e.g., analog waveforms and/or low-layer transmissions, such as PHY layer transmissions) from base station 105-2 via a particular set of frequencies, bands, or RATs, and may detect wireless transmissions (e.g., analog waveforms and/or low-layer transmissions) from UE 101 via the same frequencies, bands, or RATs. Wireless repeater 107-2 may also wirelessly transmit (e.g., repeat, using the same frequencies, bands, or RATs) the detected wireless transmissions from UE 101 and/or wireless repeater 107-2. As discussed below, UE 101 may perform a handover procedure from base station 105-1 to base station 105-2 based on detecting the repeated signals from base station 105-2.

As noted above, wireless repeater 107-2 may utilize beamforming techniques to optimize the detection or reception of wireless signals from base station 105-2, the detection or reception of wireless signals from UE 101, the transmission of wireless signals to base station 105-2, and/or the transmission of wireless signals to UE 101. For example, wireless repeater 107-2 may direct (e.g., point) one or more receivers toward base station 105-2 to optimize the detection of wireless signals from base station 105-2, may direct one or more receivers toward UE 101 to optimize the detection of wireless signals from UE 101, may direct one or more transmitters toward base station 105-2 to optimize the transmission of wireless signals to base station 105-2, and/or may direct one or more transmitters toward UE 101 to optimize the transmission of wireless signals to UE 101.

Since base station 105-2 receives low-layer traffic from wireless repeater 107-2 (e.g., a repeated version of uplink traffic initially sent by UE 101 and detected by wireless repeater 107-2), wireless repeater 107-2 does not need to perform any baseband processing on such traffic. That is, base station 105-2 may perform such baseband processing in order for the traffic to be reconstructed into higher layer traffic and routed accordingly (e.g., to a core network, an edge computing device, and/or some other network or device).

FIG. 2 illustrates an example of the handover procedure noted above, which may be performed by UE 101 after base station 105-1 has been powered down or has entered into a low-power mode. As shown, UE 101 may identify (at 202) a handover scenario, such as identifying that connectivity to base station 105-1 has been lost. For example, UE 101 may have previously been wirelessly connected to base station 105-1, and base station 105-1 may have been powered down (e.g., at 108). As noted above, wireless repeater 107-2 may detect (at 204) wireless signals from base station 105-2, and may transmit (e.g., repeat) such wireless signals to UE 101. Similarly, wireless repeater 107-2 may detect wireless signals from UE 101, and may transmit (e.g., repeat) such wireless signals to base station 105-2. As further noted above, wireless repeater 107-2 may utilize beamforming techniques or other suitable techniques to optimize the reception and/or transmission of wireless signals to and/or from UE 101 and/or base station 105-2.

In this sense, base station 105-2 and UE 101 may be able to communicate with each other. That is, since low-layer wireless signals are propagated by wireless repeater 107-2, UE 101 and base station 105-2 may perform connection procedures and may subsequently communicate as if the propagated (e.g., repeated) signals were directly transmitted between UE 101 and base station 105-2.

Figure 3:
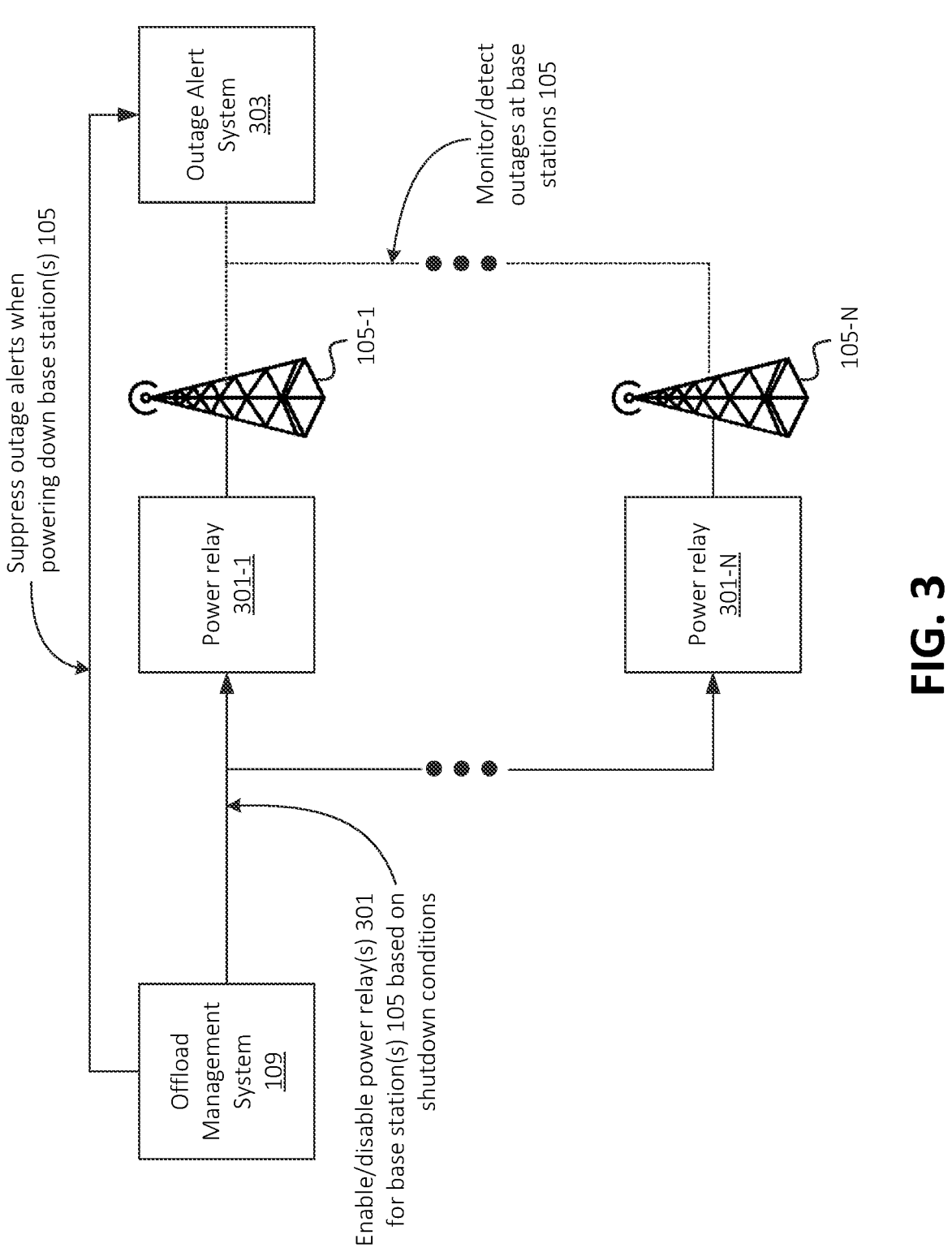
FIGS. 3-6 illustrate examples of selectively providing power to base stations, in accordance with some embodiments.

FIGS. 3-6 provide embodiments of implementing shutdown and/or low-power procedures with respect to base stations 105. As shown in FIG. 3, OMS 109 may be communicatively coupled to one or more power relays 301, which may each be communicatively coupled to a respective base station 105. While the term "relay" is used herein, in practice, similar concepts may apply to other types of devices or facilities, such as switches, breakers, substations, etc., which may have the ability to selectively shut off electrical power provided to respective base stations 105. OMS 109 may, for example, enable, disable, activate, deactivate, switch on, switch off, etc., respective power relays 301 based on identifying shutdown conditions associated with corresponding base stations 105. For example, when identifying a shutdown condition for base station 105-1, OMS 109 may identify that power relays 301-1 is communicatively coupled to base station 105-1, and may accordingly disable power relay 301-1. Disabling power relay 301-1 may, for example, cause base station 105-1 to no longer receive electrical power. In some embodiments, disabling power relay 301-1 may cause certain portions, devices, or subsystems of base station 105-1 to no longer receive electrical power, while other portions, devices, or subsystems of base station 105-1 continue to receive electrical power (e.g., disabling power relay 301-1 may result in a partial shutdown of base station 105-1).

In some embodiments, one or more base stations 105 may also be communicatively coupled to Outage Alert System 303, which may detect service outages at base stations 105. For example, Outage Alert System 303 may detect when base stations 105 have lost electrical power, when base stations 105 have not sent or received wireless signals for at least a threshold amount of time, etc. When base stations 105 have experienced such outages, Outage Alert System 303 may issue alerts such as audible alarms, push notifications, emails, etc., in order to facilitate diagnosis and remediation of such outages. In this instance, since base station 105-1 has been intentionally disabled (e.g., powered down), OMS 109 may suppress outage alerts associated with base station 105-1. For example, OMS 109 may notify Outage Alert System 303 that an outage alert for base station 105-1 should not be issued, as OMS 109 has disabled base station 105-1 intentionally. In this manner, Outage Alert System 303 may avoid issuing false alarms when base stations 105 are disabled in accordance with embodiments described herein.

Figure 4:
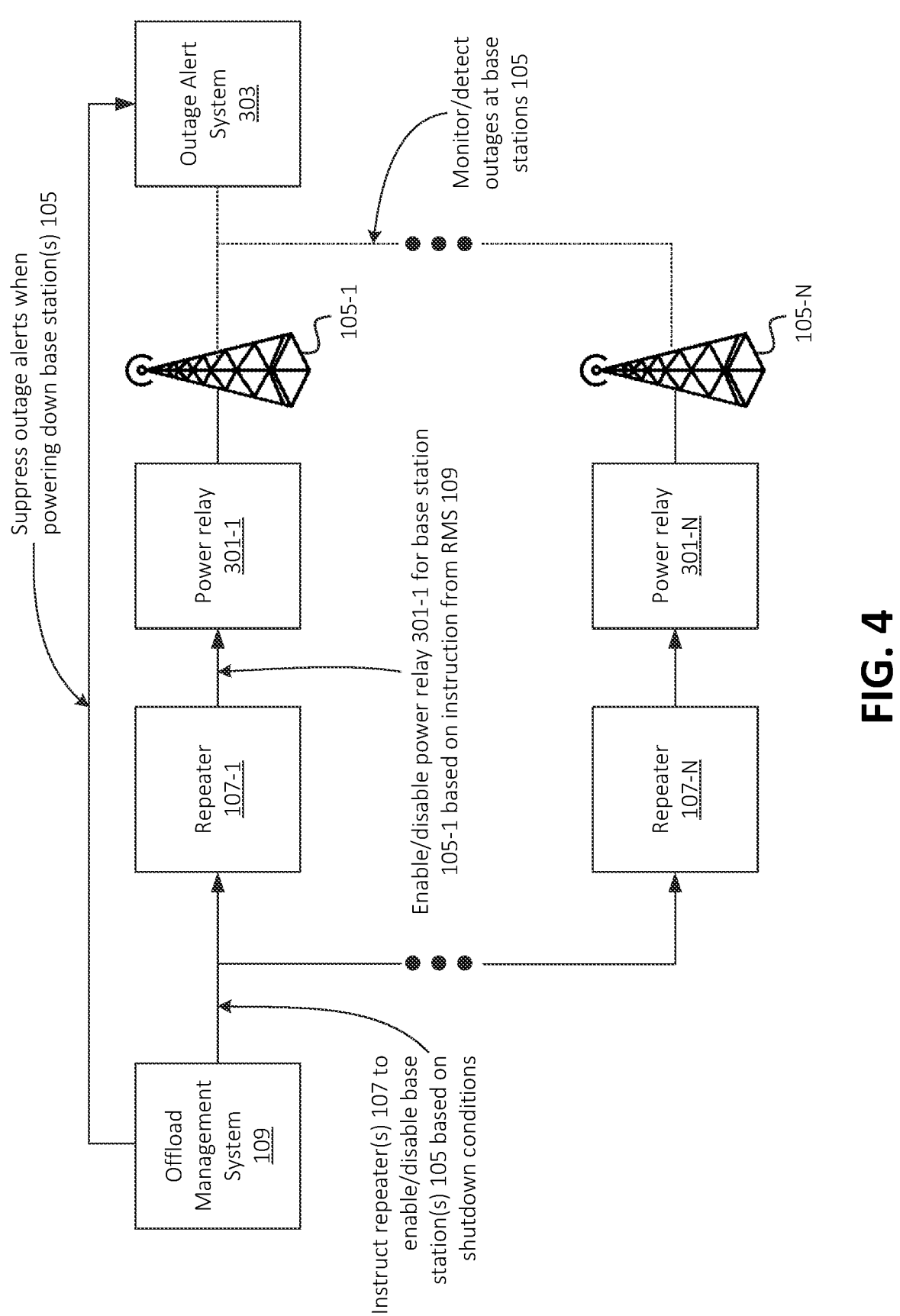

FIG. 4 illustrates an example embodiment, in which respective repeaters 107 are communicatively coupled to respective power relays 301. As shown, OMS 109 may instruct wireless repeaters 107 to enable or disable respective base stations 105 (e.g., OMS 109 may maintain information specifying which wireless repeaters 107 are communicatively coupled to which respective base stations 105). For example, OMS 109 may instruct wireless repeater 107-1 to enable or disable base station 105-1, and may instruct wireless repeater 107-N to enable or disable base station 105-N. In accordance with some embodiments, wireless repeaters 107 may be communicatively coupled to respective power relays 301, and may enable or disable corresponding base stations 105 by enabling or disabling respective power relays 301.

Figure 5:
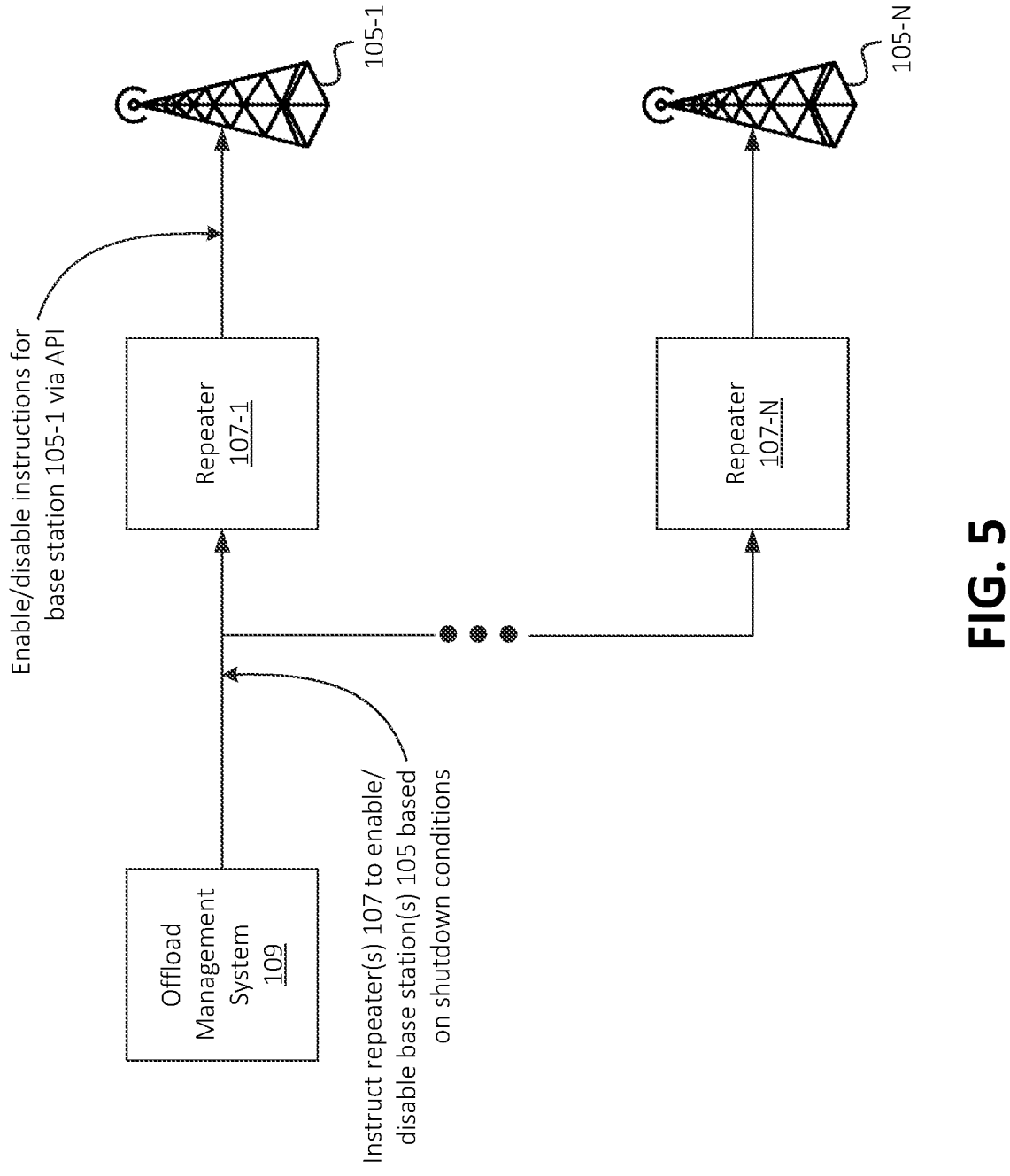

As shown in FIG. 5, OMS 109 may instruct wireless repeaters 107 to enable or disable respective base stations 105, as similarly noted above with respect to FIG. 4. In the example of FIG. 5, wireless repeaters 107 may communicate with respective base stations 105 (e.g., via an API), and may instruct base stations 105 to shut down or enter a low-power mode. For example, base stations 105 may have an integrated power relay which is able to enable or disable electrical power transmission to other components of base stations 105 (e.g., antennas, baseband processing apparatus, cooling apparatus, etc.). Additionally, or alternatively, base stations 105 may support different modes of operation, including a low-power mode that consumes less electrical power by way of shutting down certain hardware components, performing fewer processing computations, running less cooling apparatus, etc.

Figure 6:
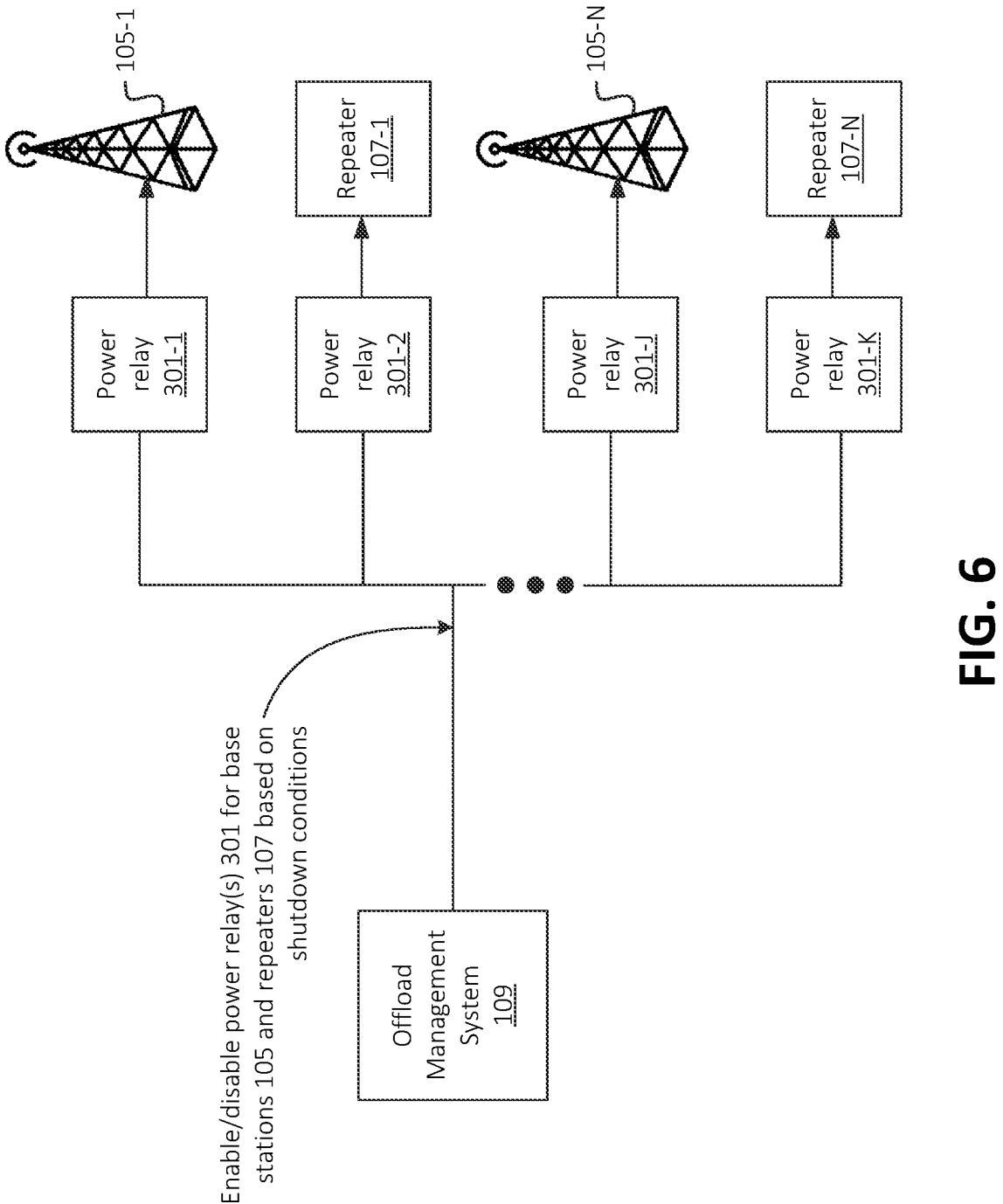

In some embodiments, as shown in FIG. 6, electrical power for individual wireless repeaters 107 may also be selectively provided by OMS 109. For example, OMS 109 may be communicatively coupled to power relays 301 that provide electrical power to corresponding wireless repeaters 107 (e.g., power relay 301-2 may provide electrical power to wireless repeater 107-1 and power relay 301-K may provide electrical power to wireless repeater 107-N). In some embodiments, OMS 109 may independently activate or deactivate power to one or more base stations 105 and/or wireless repeaters 107. For example, assume that base station 105-1 and wireless repeater 107-1 are co-located (e.g., are located within a threshold geographical proximity to each other). As such, OMS 109 may generally select wireless repeater 107-1 to serve UEs within a coverage area 103-1 of base station 105-1 when powering down base station 105-1. For example, OMS 109 may cause power relay 301-1 to cease providing power to base station 105-1, and may cause power relay 301-2 to provide power to wireless repeater 107-1. In some situations, OMS 109 may contemporaneously cause or allow power relay 301-1 to provide power to base station 105-1 and cause or allow power relay 301-2 to provide power to wireless repeater 107-1. For example, when determining that base station 105-1 may be powered down in order to save power, OMS 109 may first cause power relay 301-2 to provide power to wireless repeater 107-1, such that wireless repeater 107-1 can begin repeating wireless signals from another base station (e.g., base station 105-2) prior to shutdown of base station 105-1. As another example, OMS 109 may allow base station 105-1 to remain powered on, but may cause wireless repeater 107-1 to be powered up (e.g., repeat signals to and from base station 105-2) for other reasons, such as to extend the coverage area of base station 105-2.

Figure 7:
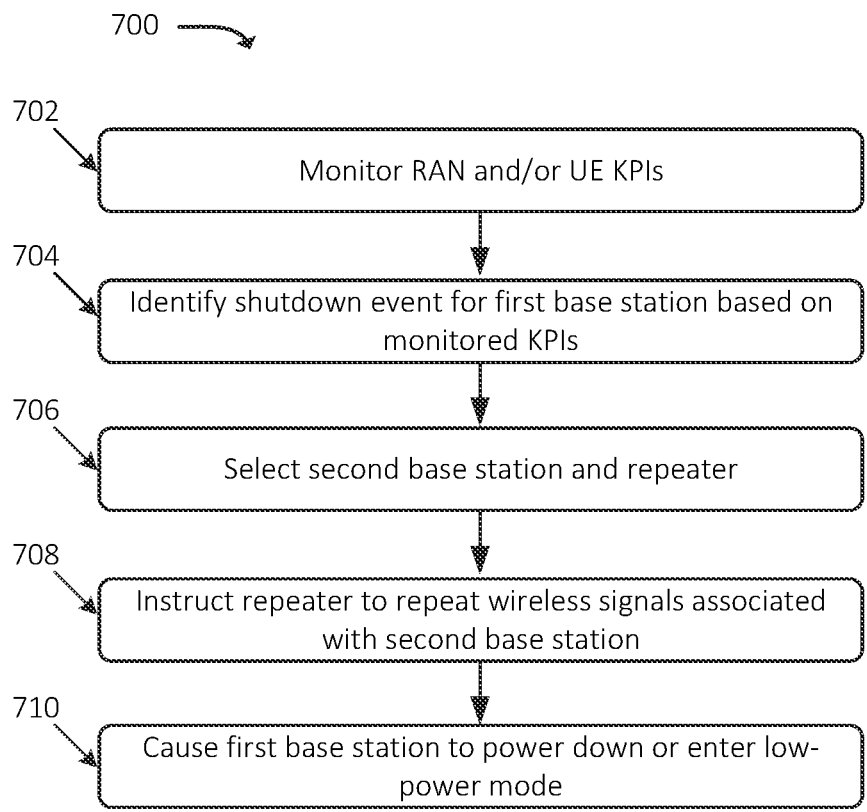
FIG. 7 illustrates an example process for selectively offloading base stations using wireless repeaters, in accordance with some embodiments.

FIG. 7 illustrates an example process 700 for selectively offloading base stations using wireless repeaters. In some embodiments, some or all of process 700 may be performed by OMS 109. In some embodiments, one or more other devices may perform some or all of process 700 in concert with, and/or in lieu of, OMS 109.

As shown, process 700 may include monitoring (at 702) RAN and/or UE KPIs. For example, as discussed above, OMS 109 may receive load metrics associated with one or more base stations, performance metrics and/or QoS parameters associated with one or more UEs 101, location information of UEs 101, and/or other suitable KPIs (e.g., on an ongoing basis). Additionally, or alternatively, the KPIs may include estimated or predicted KPIs, which may be determined using AI/ML techniques or other suitable modeling techniques.

Process 700 may further include identifying (at 704) an occurrence of a shutdown event for a first base station (e.g., base station 105-1) based on the monitored KPIs. For example, OMS 109 may identify such event based on factors such as relatively low utilization of resources of base station 105-1, a relatively small quantity of UEs 101 connected to base station 105-1, relatively large amount of available wireless resources at base station 105-1, etc.

Process 700 may additionally include selecting (at 706) a second base station (e.g., base station 105-2) and a particular repeater device (e.g., wireless repeater 107-2). For example, based on identifying the occurrence of the shutdown event, OMS 109 may select base station 105-2 and wireless repeater 107-2 based on factors such as connectivity between wireless repeater 107-2 and base station 105-2, connectivity between wireless repeater 107-2 and one or more UEs 101 that are connected to or that are in communication range of base station 105-1, geographical proximity between base station 105-2 and wireless repeater 107-2, geographical proximity between wireless repeater 107-2 and such UEs 101, availability of resources at base station 105-2 to accommodate the additional load of such UEs 101, ability of base station 105-2 to meet QoS parameters associated with such UEs 101, and/or other factors. For example, while in some situations wireless repeater 107-2 may be selected to repeat wireless signals associated with base station 105-2, in other situations another wireless repeater 107 may be selected to repeat wireless signals associated with base station 105-2. Additionally, or alternatively, a different base station 105 may be selected (e.g., if base station 105-2 is congested), for which one or more other wireless repeaters 107 may be selected as well.

Process 700 may also include instructing (at 708) the selected repeater device to repeat wireless signals associated with the second base station. For example, OMS 109 may, in some embodiments, provide an indication, to wireless repeater 107-2, of which sets of frequencies, bands, RATs, etc. to implement (e.g., in implements where wireless repeater 107-2 is able to implement different frequencies, bands, RATs, etc.). Additionally, or alternatively, OMS 109 may cause OMS 109 to receive electrical power (e.g., by activating a power relay, switch, substation, etc. that provides electrical power to wireless repeater 107-2).

Process 700 may further include causing (at 710) the first base station to power down or enter into a low-power mode. For example, as discussed above, OMS 109 may cause one or more power relays, switches, substations, etc. that provide electrical power to base station 105-1 to no longer provide electrical power to base station 105-1. Additionally, or alternatively, OMS 109 may communicate with the selected wireless repeater 107-2, which may in turn cause base station 105-1 to no longer receive electrical power. For example, as discussed above, OMS 109 and/or wireless repeater 107-2 may communicate with base station 105-1 via an API to issue a command to shut down or enter a low-power mode. As discussed above, once base station 105-1 shuts down or enters a low-power mode, one or more UEs 101 that are connected to base station 105-1 may perform a handover procedure, a reselection procedure, etc. in which such UEs 101 may identify wireless signals transmitted by one or more other base stations, such as base station 105-2 (e.g., as repeated by wireless repeater 107-2). As discussed above, wireless repeater 107-2 may also repeat wireless signals transmitted by UEs 101, such that base station 105-2 receives such wireless signals. In this sense, UEs 101 and base station 105-2 may communicate as if UEs 101 were directly wirelessly connected to base station 105-2.

Figure 8:
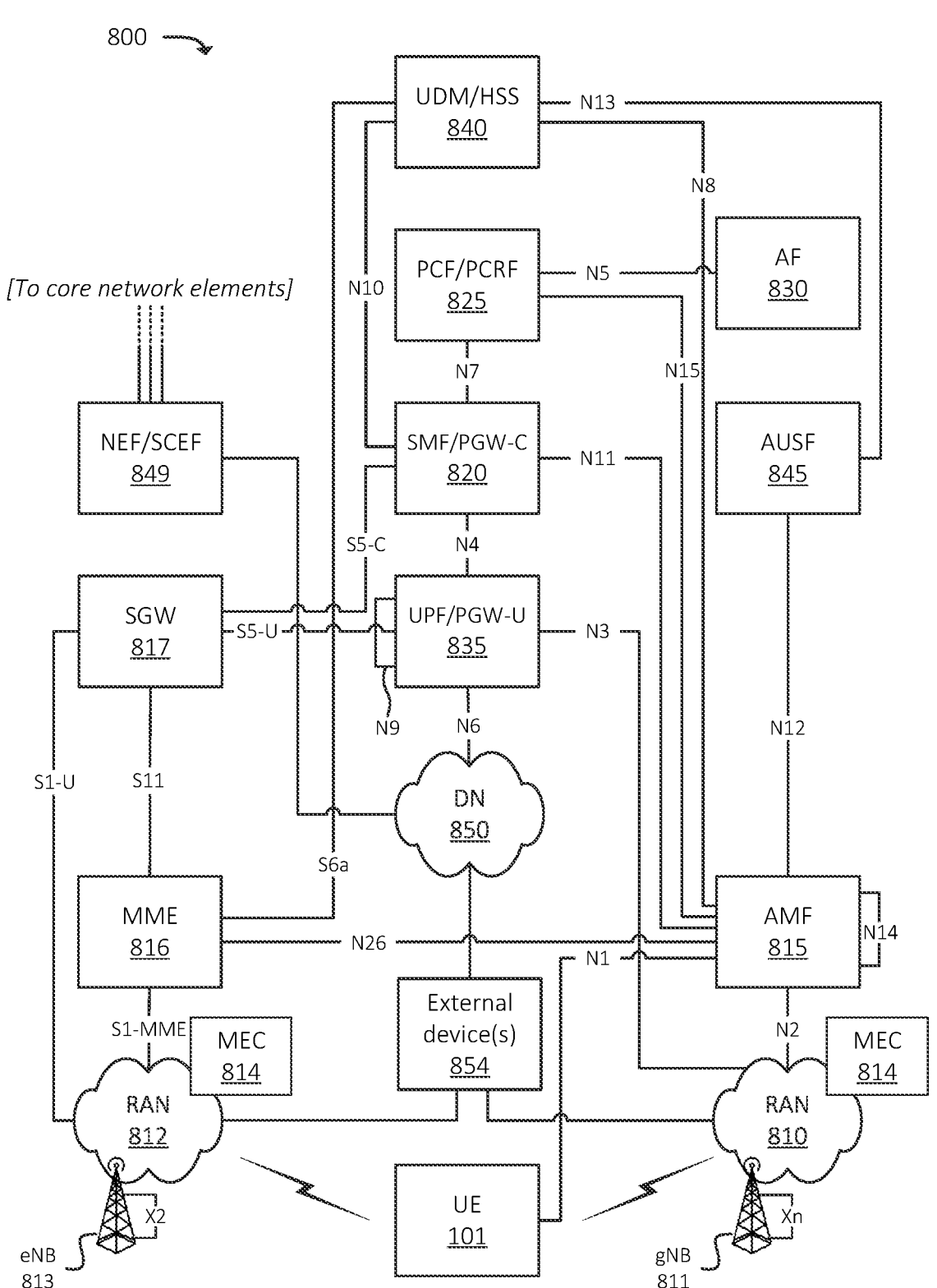
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment

800 may represent or may include a 5G core ("5GC"). As shown, environment 800 may include UE 101, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, Authentication Server Function ("AUSF") 845, and Network Exposure Function ("NEF")/ Service Capability Exposure Function ("SCEF") 849. Environment 800 may also include one or more networks, such as Data Network ("DN") 850. Environment 800 may include one or more additional devices or systems communicatively coupled to one or more networks (e.g., DN 850), such as one or more external devices 854.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Additionally, one or more elements of environment 800 may be implemented in a virtualized and/or containerized manner. For example, one or more of the elements of environment 800 may be implemented by one or more Virtualized Network Functions ("VNFs"), Cloud-Native Network Functions ("CNFs"), etc. In such embodiments, environment 800 may include, may implement, and/or may be communicatively coupled to an orchestration platform that provisions hardware resources, installs containers or applications, performs load balancing, and/or otherwise manages the deployment of such elements of environment 800. In some embodiments, such orchestration and/or management of such elements of environment 800 may be performed by, or in conjunction with, the open-source Kubernetes® application programming interface ("API") or some other suitable virtualization, containerization, and/or orchestration system.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 850 via RAN 810, RAN 812, and/or UPF/PGW-U 835.

RAN 810 may be, or may include, a 5G RAN that implements a 5G RAT and that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., user plane traffic such as voice call traffic, data traffic, messaging traffic, etc.) from UE 101 via the air interface, and may communicate the traffic to UPF/PGW-U 835 and/or one or more other devices or networks. Further, RAN 810 may receive signaling traffic, control plane traffic, etc. from UE 101 via the air interface, and may communicate such signaling traffic, control plane traffic, etc. to AMF 815 and/or one or more other devices or networks. Additionally, RAN 810 may receive traffic intended for UE 101 (e.g., from UPF/PGW-U 835, AMF 815, and/or one or more other devices or networks) and may communicate the traffic to UE 101 via the air interface. In some embodiments, base station 105 may be, may include, and/or may be implemented by one or more gNBs 811.

RAN 812 may be, or may include, an LTE RAN that implements an LTE RAT and that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 101 via the air interface, and may communicate the traffic to UPF/PGW-U 835 (e.g., via SGW 817) and/or one or more other devices or networks. Further, RAN 812 may receive signaling traffic, control plane traffic, etc. from UE 101 via the air interface, and may communicate such signaling traffic, control plane traffic, etc. to MME 816 and/or one or more other devices or networks. Additionally, RAN 812 may receive traffic intended for UE 101 (e.g., from UPF/PGW-U 835, MME 816, SGW 817, and/or one or more other devices or networks) and may communicate the traffic to UE 101 via the air interface. In some embodiments, base station 105 may be, may include, and/or may be implemented by one or more eNBs 813.

One or more RANs of environment 800 (e.g., RAN 810 and/or RAN 812) may include, may implement, and/or may otherwise be communicatively coupled to one or more edge computing devices, such as one or more Multi-Access/Mobile Edge Computing ("MEC") devices (referred to sometimes herein simply as a "MECs") 814. MECs 814 may be co-located with wireless network infrastructure equipment of RANs 810 and/or 812 (e.g., one or more gNBs 811 and/or one or more eNBs 813, respectively). Additionally, or alternatively, MECs 814 may otherwise be associated with geographical regions (e.g., coverage areas) of wireless network infrastructure equipment of RANs 810 and/or 812. In some embodiments, one or more MECs 814 may be implemented by the same set of hardware resources, the same set of devices, etc. that implement wireless network infrastructure equipment of RANs 810 and/or 812. In some embodiments, one or more MECs 814 may be implemented by different hardware resources, a different set of devices, etc. from hardware resources or devices that implement wireless network infrastructure equipment of RANs 810 and/or 812. In some embodiments, MECs 814 may be communicatively coupled to wireless network infrastructure equipment of RANs 810 and/or 812 (e.g., via a high-speed and/or low-latency link such as a physical wired interface, a high-speed and/or low-latency wireless interface, or some other suitable communication pathway).

MECs 814 may include hardware resources (e.g., configurable or provisionable hardware resources) that may be configured to provide services and/or otherwise process traffic to and/or from UE 101, via RAN 810 and/or 812. For example, RAN 810 and/or 812 may route some traffic from UE 101 (e.g., traffic associated with one or more particular services, applications, application types, etc.) to a respective MEC 814 instead of to core network elements of 800 (e.g., UPF/PGW-U 835). MEC 814 may accordingly provide services to UE 101 by processing such traffic, performing one or more computations based on the received traffic, and providing traffic to UE 101 via RAN 810 and/or 812. MEC 814 may include, and/or may implement, some or all of the functionality described above with respect to UPF/PGW-U 835, AF 830, one or more application servers, and/or one or more other devices, systems, VNFs, CNFs, etc. In this manner, ultra-low latency services may be provided to UE 101, as traffic does not need to traverse links (e.g., backhaul links) between RAN 810 and/or 812 and the core network.

AMF 815 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple instances of UPF/PGW-U 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. In some embodiments, UDM/HSS 840 may include, may implement, may be communicatively coupled to, and/or may otherwise be associated with some other type of repository or database, such as a Unified Data Repository ("UDR"). AUSF 845 and/or UDM/HSS 840 may perform authentication, authorization, and/or accounting operations associated with one or more UEs 101 and/or one or more communication sessions associated with one or more UEs 101.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

External devices 854 may include one or more devices or systems that communicate with UE 101 via DN 850 and one or more elements of 800 (e.g., via UPF/PGW-U 835). In some embodiments, external devices 854 may include, may implement, and/or may otherwise be associated with OMS 109 and/or Outage Alert System 303. External devices 854 may include, for example, one or more application servers, content provider systems, web servers, or the like. External devices 854 may, for example, implement "server-side" applications that communicate with "client-side" applications executed by UE 101. External devices 854 may provide services to UE 101 such as gaming services, videoconferencing services, messaging services, email services, web services, and/or other types of services.

In some embodiments, external devices 854 may communicate with one or more elements of environment 800 (e.g., core network elements) via NEF/SCEF 849. NEF/SCEF 849 include one or more devices, systems, VNFs, CNFs, etc. that provide access to information, APIs, and/or other operations or mechanisms of one or more core network elements to devices or systems that are external to the core network (e.g., to external device 854 via DN 850). NEF/SCEF 849 may maintain authorization and/or authentication information associated with such external devices or systems, such that NEF/SCEF 849 is able to provide information, that is authorized to be provided, to the external devices or systems. For example, a given external device 854 may request particular information associated with one or more core network elements. NEF/SCEF 849 may authenticate the request and/or otherwise verify that external device 854 is authorized to receive the information, and may request, obtain, or otherwise receive the information from the one or more core network elements. In some embodiments, NEF/SCEF 849 may include, may implement, may be implemented by, may be communicatively coupled to, and/or may otherwise be associated with a Security Edge Protection Proxy ("SEPP"), which may perform some or all of the functions discussed above. External device 854 may, in some situations, subscribe to particular types of requested information provided by the one or more core network elements, and the one or more core network elements may provide (e.g., "push") the requested information to NEF/SCEF 849 (e.g., in a periodic or otherwise ongoing basis).

In some embodiments, external devices 854 may communicate with one or more elements of RAN 810 and/or 812 via an API or other suitable interface. For example, a given external device 854 may provide instructions, requests, etc. to RAN 810 and/or 812 to provide one or more services via one or more respective MECs 814. In some embodiments, such instructions, requests, etc. may include QoS parameters, Service Level Agreements ("SLAs"), etc. (e.g., maximum latency thresholds, minimum throughput thresholds, etc.) associated with the services.

Figure 9:
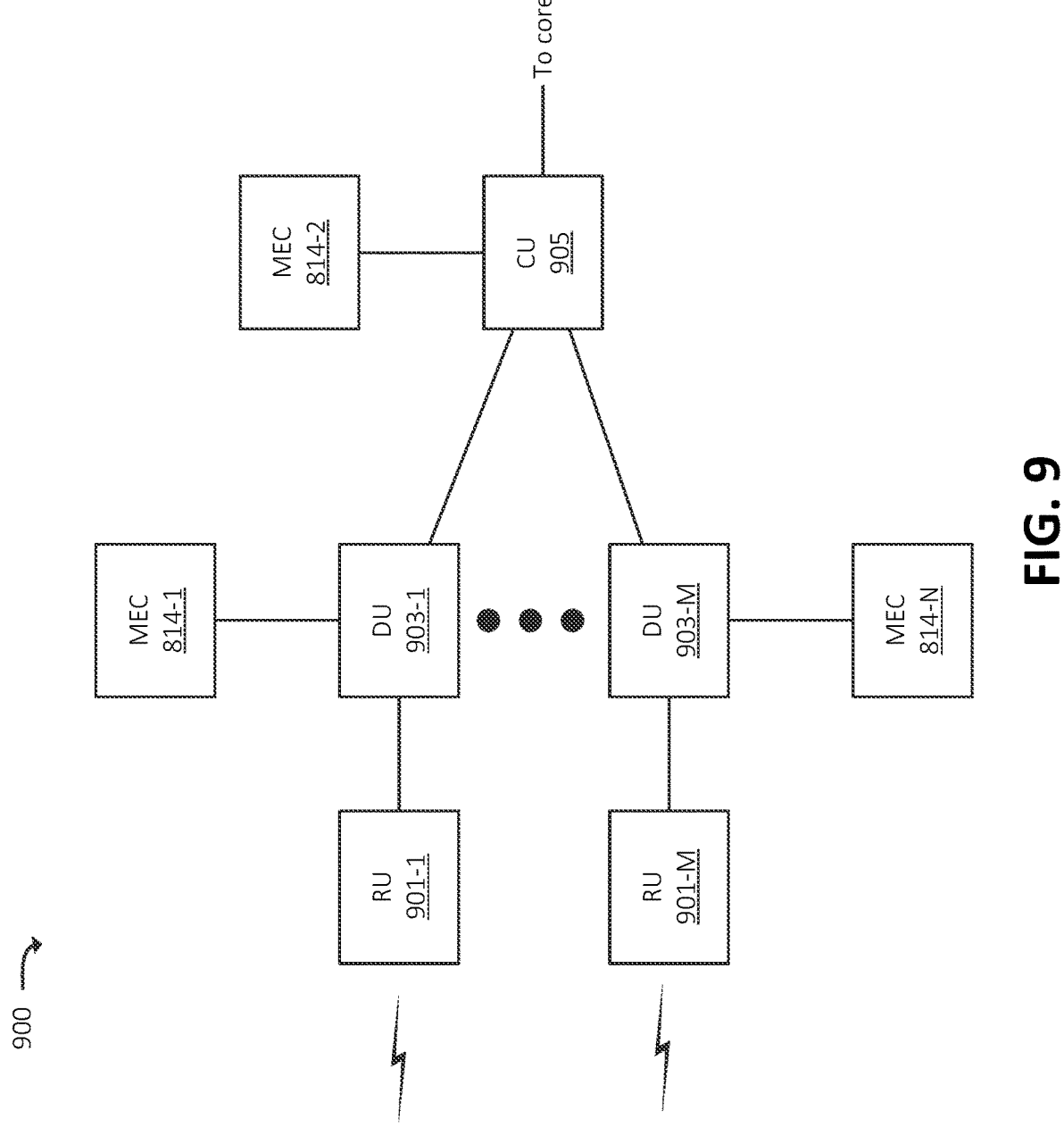
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810 or some other RAN). In some embodiments, a particular RAN 810 may include one RAN environment 900. In some embodiments, a particular RAN 810 may include multiple RAN environments 900. In some embodiments, RAN environment 900 may correspond to a particular gNB 811 of RAN 810. In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-M (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8) and/or some other device or system such as MEC 814. In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC") traffic) from DUs 903, and may perform higher-layer processing (e.g., may aggregate/process RLC packets and generate Packet Data Convergence Protocol ("PDCP") packets based on the RLC packets) on the traffic received from DUs 903.

CU 905 may receive downlink traffic (e.g., traffic from the core network, traffic from a given MEC 814, etc.) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more MECs 814. For example, DU 903-1 may be communicatively coupled to MEC 814-1, DU 903-M may be communicatively coupled to MEC 814-N, CU 905 may be communicatively coupled to MEC 814-2, and so on. MECs 814 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 814-1 instead of to a core network via CU 905. MEC 814-1 may process the traffic, perform one or more computations based on the received traffic, and may provide traffic to UE 101 via RU 901-1. As discussed above, MEC 814 may include, and/or may implement, some or all of the functionality described above with respect to AF 830, external devices 854, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
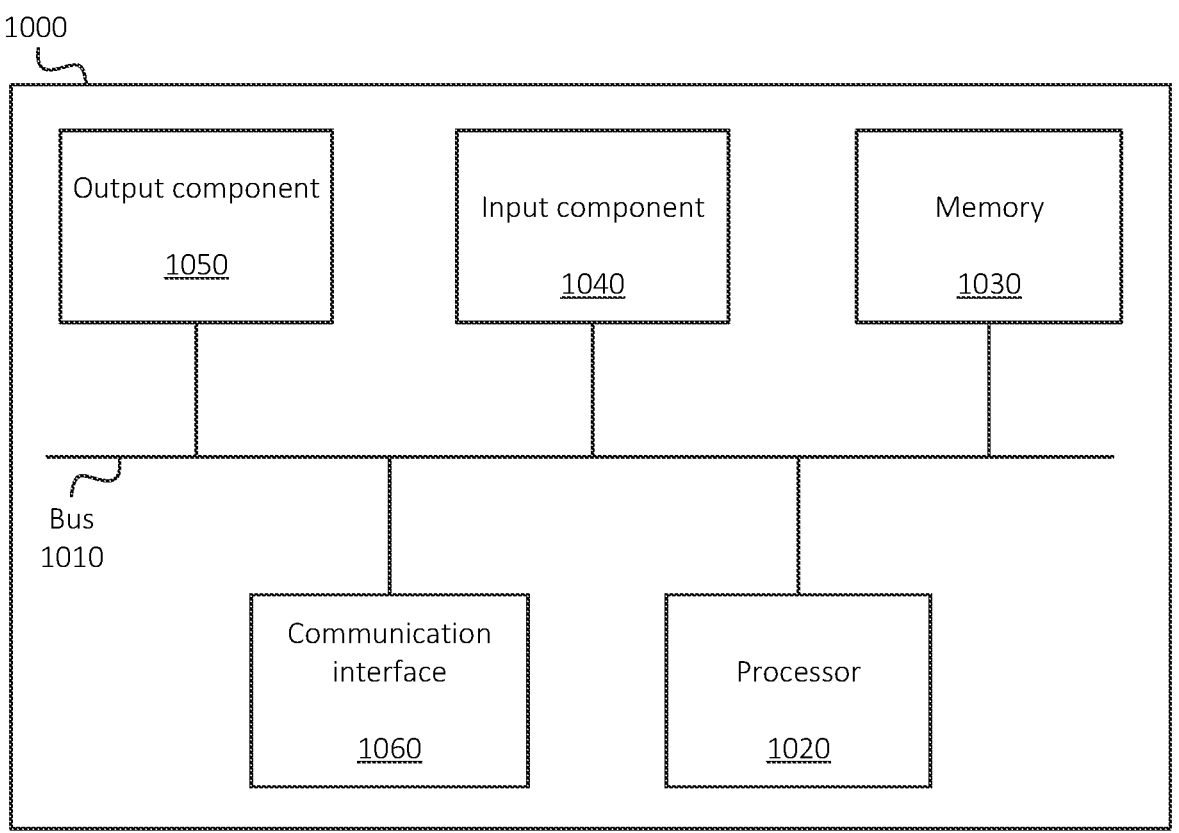
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 810, RAN 812, DN 850, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify one or more Key Performance Indicators ("KPIs") associated with a first base station;
identify, based on the one or more KPIs, an occurrence of a particular event;
select, based on identifying the occurrence of the particular event, a second base station and a repeater device, wherein the repeater device and the second base station implement a same set of wireless frequencies;
cause, further based on identifying the occurrence of the particular event, the repeater device to repeat wireless signals transmitted to or from the second base station; and
cause, further based on identifying the occurrence of the particular event, the first base station to shut down or to enter a low-power mode,
wherein a particular UE is wirelessly connected to the first base station prior to the first base station shutting down or entering the low-power mode, and wherein the UE wirelessly connects to the second base station via the repeater device based on the first base station shutting down or entering the low-power mode.

2. The device of claim 1, wherein wirelessly connecting to the second base station includes the UE performing a handover procedure from the first base station to the second base station.

3. The device of claim 1, wherein the one or more KPIs associated with the first base station include one or more load metrics of the first base station, wherein identifying the occurrence of the particular event includes determining that the one or more load metrics are below one or more thresholds.

4. The device of claim 1, wherein the one or more processors are further configured to:

identify one or more KPIs associated with the second base station and a third base station; and select the second base station, in lieu of the third base station, based on the one or more KPIs associated with the second base station and the third base station.

5. The device of claim 1, wherein selecting the repeater device includes determining that one or more measures of channel quality between the repeater device and the UE exceed one or more thresholds.

6. The device of claim 5, wherein selecting the repeater device further includes determining that one or more measures of channel quality between the repeater device and the second base station exceed one or more thresholds.

7. The device of claim 1, wherein causing the first base station to shut down or enter the low-power mode includes:

disabling a power relay that provides electrical power to the first base station; and suppressing an outage alert triggered based on loss of power to the first base station.

8. A non-transitory computer-readable medium, storing a plurality of processor-executable instructions to:

identify one or more Key Performance Indicators ("KPIs") associated with a first base station;

identify, based on the one or more KPIs, an occurrence of a particular event;

select, based on identifying the occurrence of the particular event, a second base station and a repeater device, wherein the repeater device and the second base station implement a same set of wireless frequencies;

cause, further based on identifying the occurrence of the particular event, the repeater device to repeat wireless signals transmitted to or from the second base station; and cause, further based on identifying the occurrence of the particular event, the first base station to shut down or to enter a low-power mode, wherein a particular UE is wirelessly connected to the first base station prior to the first base station shutting down or entering the low-power mode, and wherein the UE wirelessly connects to the second base station via the repeater device based on the first base station shutting down or entering the low-power mode.

9. The non-transitory computer-readable medium of claim 8, wherein wirelessly connecting to the second base station includes the UE performing a handover procedure from the first base station to the second base station.

10. The non-transitory computer-readable medium of claim 8, wherein the one or more KPIs associated with the first base station include one or more load metrics of the first base station, wherein identifying the occurrence of the particular event includes determining that the one or more load metrics are below one or more thresholds.

11. The non-transitory computer-readable medium of claim 8, wherein the plurality of processor-executable instructions further include processor-executable instructions to:

identify one or more KPIs associated with the second base station and a third base station; and select the second base station, in lieu of the third base station, based on the one or more KPIs associated with the second base station and the third base station.

12. The non-transitory computer-readable medium of claim 8, wherein selecting the repeater device includes determining that one or more measures of channel quality between the repeater device and the UE exceed one or more thresholds.

13. The non-transitory computer-readable medium of claim 12, wherein selecting the repeater device further includes determining that one or more measures of channel quality between the repeater device and the second base station exceed one or more thresholds.

14. The non-transitory computer-readable medium of claim 8, wherein causing the first base station to shut down or enter the low-power mode includes:

disabling a power relay that provides electrical power to the first base station; and suppressing an outage alert triggered based on loss of power to the first base station.

15. A method, comprising:

identifying one or more Key Performance Indicators ("KPIs") associated with a first base station;

identifying, based on the one or more KPIs, an occurrence of a particular event;

selecting, based on identifying the occurrence of the particular event, a second base station and a repeater device, wherein the repeater device and the second base station implement a same set of wireless frequencies;

causing, further based on identifying the occurrence of the particular event, the repeater device to repeat wireless signals transmitted to or from the second base station; and causing, further based on identifying the occurrence of the particular event, the first base station to shut down or to enter a low-power mode, wherein a particular UE is wirelessly connected to the first base station prior to the first base station shutting down or entering the low-power mode, and wherein the UE wirelessly connects to the second base station via the repeater device based on the first base station shutting down or entering the low-power mode.

16. The method of claim 15, wherein wirelessly connecting to the second base station includes the UE performing a handover procedure from the first base station to the second base station.

17. The method of claim 15, wherein the one or more KPIs associated with the first base station include one or more load metrics of the first base station, wherein identifying the occurrence of the particular event includes determining that the one or more load metrics are below one or more thresholds.

18. The method of claim 15, further comprising:

identify one or more KPIs associated with the second base station and a third base station; and select the second base station, in lieu of the third base station, based on the one or more KPIs associated with the second base station and the third base station.

19. The method of claim 15, wherein selecting the repeater device includes:

determining that one or more measures of channel quality between the repeater device and the UE exceed one or more thresholds, and determining that one or more measures of channel quality between the repeater device and the second base station exceed one or more thresholds.

20. The method of claim 15, wherein causing the first base station to shut down or enter the low-power mode includes:

disabling a power relay that provides electrical power to the first base station; and suppressing an outage alert triggered based on loss of power to the first base station.

\* \* \* \* \*